United States Patent [19]

Gillespie et al.

[11] 4,273,418

[45] Jun. 16, 1981

[54] MIRROR FOR PRODUCING OPTICAL ILLUSIONS

[75] Inventors: Richard L. Gillespie, San Gabriel; Douglas A. Geller, Monrovia, both of Calif.

[73] Assignee: WHAM-O Mfg. Co., San Gabriel, Calif.

[21] Appl. No.: 98,939

[22] Filed: Nov. 30, 1979

[51] Int. Cl.³ .............................................. G02B 5/08
[52] U.S. Cl. .................................. 350/289; 272/8 M; 350/274
[58] Field of Search ............................... 350/272-275, 350/288, 289, 291; 356/391-394; 272/8 M

[56] References Cited

U.S. PATENT DOCUMENTS

| | | |
|---|---|---|
| 1,268,010 | 5/1918 | Hugden .......................... 350/288 X |
| 1,979,119 | 10/1934 | Radzinsky ....................... 350/288 X |
| 2,344,296 | 3/1944 | Frink ............................... 356/392 X |
| 3,659,928 | 5/1972 | Macfarlane ...................... 350/291 |

Primary Examiner—F. L. Evans
Attorney, Agent, or Firm—Christie, Parker & Hale

[57] ABSTRACT

Apparatus for creating optical illusions utilizing a rotating circular disc having alternating transparent and reflective areas according to a predetermined pattern. The reflective area is approximately equal to the transparent area. As the disc rotates at a user's selected speed the user perceives alternating reflected and transmitted images. Thus where the apparatus is positioned between an object and the user the transmitted image of the object is superimposed upon the reflected image of the user and consequently the two images merge to form the desired optical illusion.

20 Claims, 11 Drawing Figures

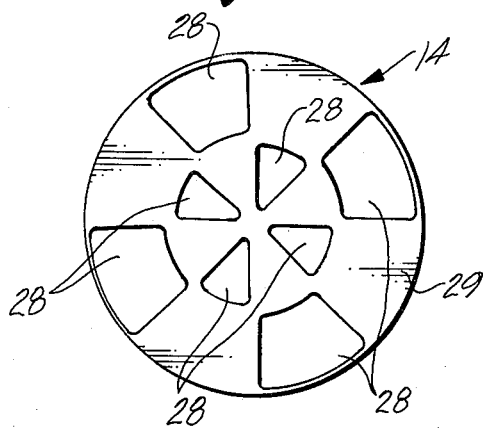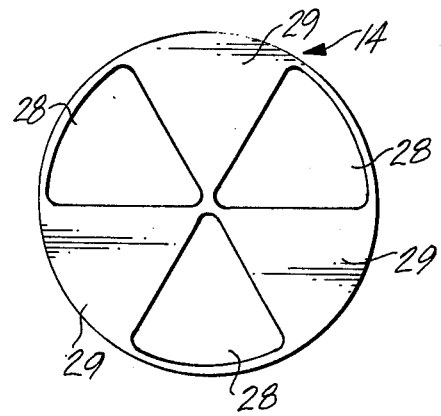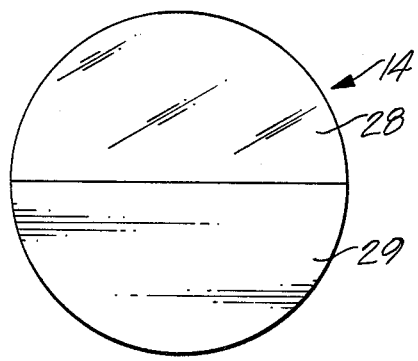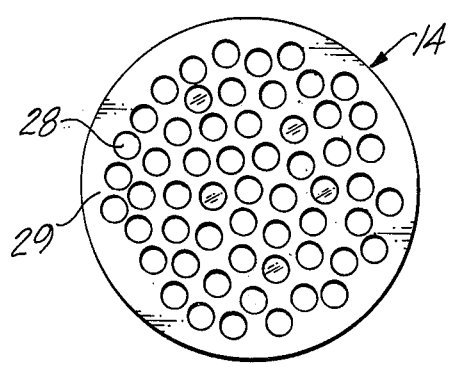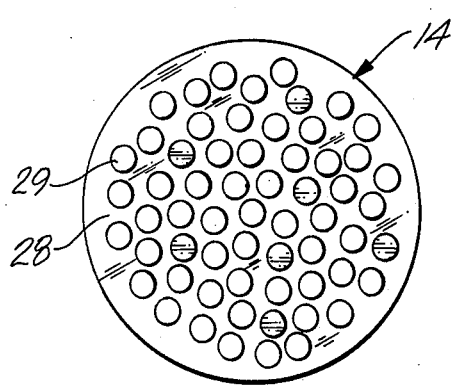

MIRROR FOR PRODUCING OPTICAL ILLUSIONS

BACKGROUND OF THE INVENTION

This invention relates to apparatus for creating optical illusions utilizing a rotating surface having alternating transparent and reflective areas. It is an object of this invention to provide an apparatus which is instructive, entertaining and amusing. When the apparatus of the present invention is positioned between two individuals and the surface is rotated at a selected speed, each individual perceives the transmitted image of the other superimposed upon the reflected image of himself. Thus, for example, if one of the observers has a mustache the other observer will perceive his reflected image having the mustache of the first individual. This optical illusion created by the rotating surface having alternating and transparent surfaces provides a great deal of amusement especially for children.

Hairdressers and purveyors of eye-glasses have found that customers desire to see themselves in the various styles of coiffeurs or eye-glasses prior to making a selection. Wigs, drawings of hairdos and samples of glasses frames have been used with varying degrees of success to satisfy this need. However, a more desirable method would permit the potential customer to actually view himself in each hairdo or pair of glasses available. Furthermore, it is desirable that the customer can compare his present hairdo or glasses with each new style available. It is therefore desirable to provide a device whereby a potential customer may view himself wearing a large variety of styles of coiffeurs or eye-glasses while alternately comparing each to his present style. U.S. Pat. No. 1,268,010 to O. Hudgen discloses a device having a mirror so arranged that when disposed between two persons in the line of sight of both so as to mask a portion of the direct image of the observed person and by reflection substitutes for the masked portion a corresponding reflected image of the observer to form composite images. A disadvantage of this system is that the entire image of the observed person is not superimposed upon the reflected image of the observer, consequently the full effect of the optical illusion is not achieved.

SUMMARY OF THE INVENTION

There is, therefore, provided in the practice of this invention according to a presently preferred embodiment, a viewing device having a housing with a reflective means rotatably mounted within the housing, the reflective means having transparent areas and reflective areas disposed over the surface according to a predetermined pattern. An electric motor located within the housing is linked to the reflective means for causing said reflective means to rotate at a predetermined speed. Additionally, a switch is mounted on the housing and connected in an electric current relationship to the motor for controlling the rotational speed of the reflective means by controlling the supply of electric power to the motor.

In a preferred embodiment the reflective means comprises a circular disc having alternating reflective and transparent circular sectors. Preferably, each of the sectors has a central angle of approximately 90° and thus there are two transparent sectors alternated with two reflective sectors. As used herein a central angle has radii of the disc as sides and the center of the disc as its vertex.

In the practice of this invention, the user positions the apparatus between himself and the object to be viewed. As the reflective means rotates, the user experiences the optical illusion of seeing his own image reflected by the reflective areas of the disc superimposed upon the image of the viewed object as transmitted through the transparent areas of the disc. Therefore, for example, children and others might amuse themselves by disposing the apparatus of the invention between two observers so that the optical illusion created allows the image of the first child to be superimposed upon the image of second child, or the beard of a male could be superimposed upon the image of a female. Additionally, the apparatus of the invention could be positioned between the user and a photograph of a coiffeur such that the viewer would perceive his image having the depicted coiffeur. The user controls the speed of rotation in order to achieve the desired optical illusion created by the alternating reflective and transparent areas of the rotating disc of the invention.

BRIEF DESCRIPTION OF THE DRAWINGS

The features of specific embodiments of the best mode contemplated of carrying out the invention are illustrated in the drawings, in which:

FIGS. 4 A, B, C, D and E are alternative embodiments of the reflective means of the invention;

DETAILED DESCRIPTION

Figure 1:
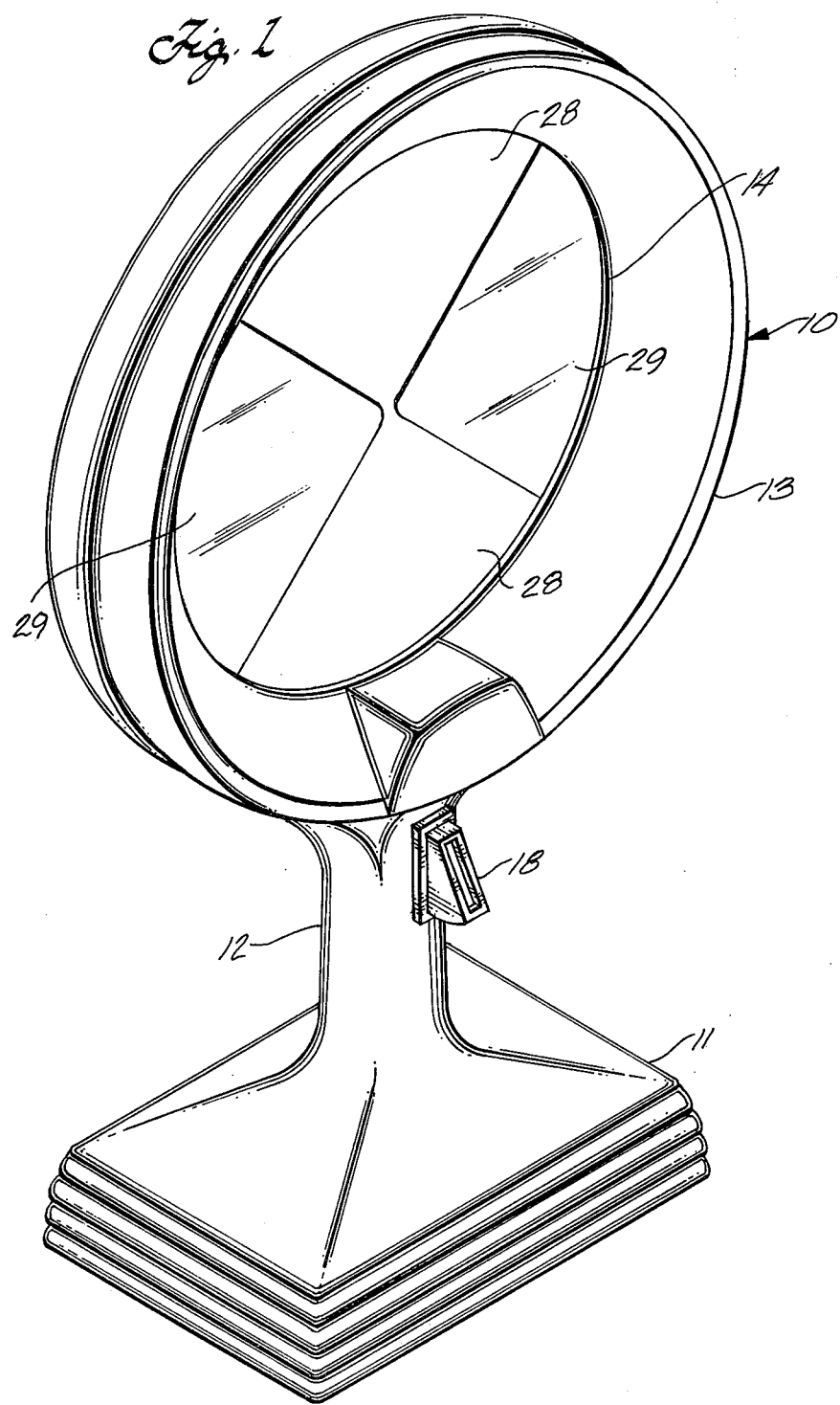
FIG. 1 illustrates a perspective view of the apparatus constructed according to the principles of this invention.
Figure 2:
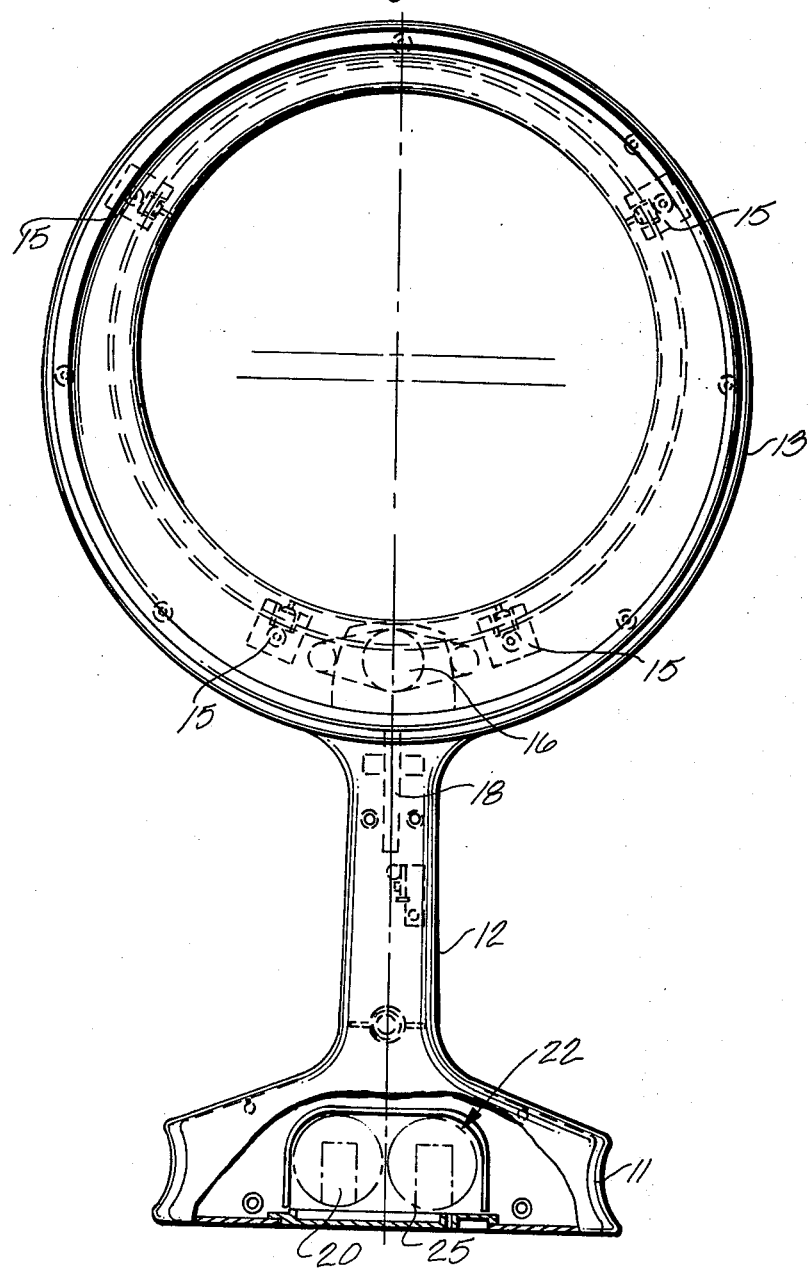
FIG. 2 is a front sectional fragmentary elevational view of the apparatus of FIG. 1.
Figure 3:
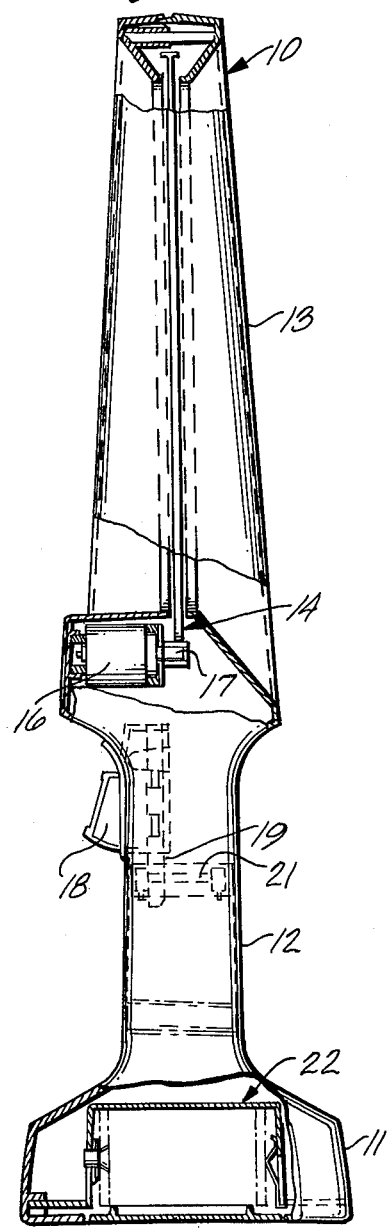
FIG. 3 is a side sectional fragmentary elevational view of the apparatus of FIG. 1.
Figure 7:
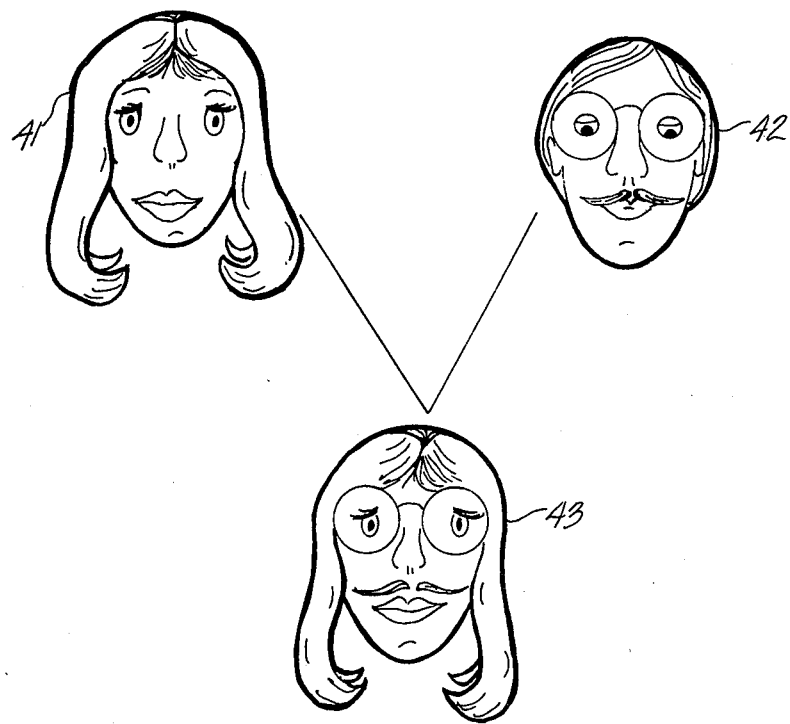
FIG. 7 is a depiction of the illusion perceived by the user of the apparatus incorporating the principles of the invention.

With reference to FIGS. 1, 2 and 3 a viewing device 10 incorporating the principles of the invention is shown. The device has a housing comprised of a base 11, and upright support 12 projecting from the base and a ring-shaped structure 13 positioned upon the top of the upright support. Preferably the housing is constructed almost entirely of plastic. a circular disc 14 is rotatably mounted within the ring-shaped structure. Positioned within the interior of the ring structure 13, is a plurality of guides 15 which are disposed at the outer circumference of the circular disc 14 for providing support and alignment for the disc within the housing.

An electric motor 16 is attached to the interior of the ring-shaped structure 13 at a position adjacent to the upright support 12. The drive shaft 17 of the motor has an axis parallel to the rotational axis of the circular disc 14. The drive shaft 17 is frictionally coupled to the outer circumference of the circular disc 14 for rotating the disc about its central axis.

A trigger 18 projecting from the upward support 12 is mechanically coupled to a wiper 19 of a rheostat 21. A source 22 of electrical power is located in the base 11 of the housing. The source 22 as shown comprises a pair of dry cell batteries 20 and 25.

Figure 5:
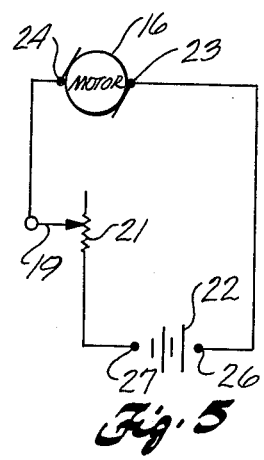
FIG. 5 is a schematic of the electrical circuit of the invention.

FIG. 5 shows the schematic of the electrical circuit of the invention. A pole 23 of the motor 16 is connected to the negative terminal 26 of the battery 22. The other pole 24 of the motor 16 is coupled to the positive terminal 27 of the battery 22 through a rheostat 21. Reversing the polarity of the voltage to the motor causes the disc to be rotated in the opposite direction. This change in polarity does not affect the illusion created by the invention. As the user depresses the trigger 18 the series resistance of the rheostat 21 is reduced, thus additional current is delivered to the motor 16 from the battery 22. As the current increases, the motor speed increases, thus increasing the rotational speed of the disc 14. As the user releases the continuously adjustable switch, the current to the motor is decreased with a concomitant decrease in the rotational speed of the disc. Therefore, the user may adjust the rotational speed of the disc by selectively positioning the trigger in order to achieve the desired optical illusion. When the trigger is completely released by the user, the wiper 19 of the rheostat 21 is repositioned to cause the circuit to be open and thus current flow to the motor stops. Therefore the rheostat functions as both a motor speed control and an on-off switch.

Figure 6:
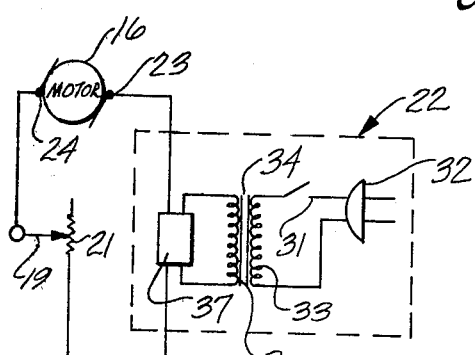
FIG. 6 is a schematic of an alternative electrical circuit of the invention.

FIG. 6 depicts an alternative circuit for the invention. The source of electrical power 22 for driving the motor 16 of the invention, is derived from ordinary alternating house current. A switch 31 selectively connects AC power 32 to the primary windings 33 of a step-down transformer 34. An alternating secondary voltage imposed in the secondary winding 36 of the transformer 34 is connected to an appropriate rectifier 37 for producing direct current of the voltage required for the motor 16.

The circular disc 14 has a plurality of alternating transparent 28 and reflective 29 areas. In the preferred embodiment (FIG. 1), the disc has alternating transparent and reflective circular sectors each having a central angle of approximately 90°. Thus, two reflective sectors are alternated with two transparent sectors. According to the invention, approximately ½ of the surface area of the circular disc should be transparent while the other half should be reflective.

FIGS. 4 A, B, C, and D depict alternative configurations for the circular disc. In FIG. 4A the alternating reflective and transparent areas are disposed within two concentric circular fields. The transparent and reflective areas are approximately defined by a series of evenly spaced radii of the circular disc and the inner and outer circum ferences of the respective circular field. Each circular field is comprised of four transparent areas 28 alternated with four reflective areas 29.

FIG. 4B depicts the disc having six alternating transparent 28 and reflective 29 areas; each area being comprised of a circular sector of the disc having a central angle of approximately 60°. FIG. 4C depicts the circular disc having a semi-circular reflective area and a semi-circular transparent area, thus the central angle formed thereby is approximately 180°. FIG. 4D depicts the circular disc having a plurality of circular reflective areas 29 disposed over the surface of a transparent disc 14. FIG. 4E shows circular transparent areas 28 disposed over a reflective disc 14. In FIGS. 4D and 4E the circular areas need not have uniform diameters. In all of the above alternative embodiments, the total reflective area of the disc is approximately equal to the total transparent area of of the disc; however, deviations from this approximate equivalency may be tolerated with some degradation in the perceived optical illusion.

In the preferred embodiment the disc 14 is comprised of clear plastic with appropriate reflective areas. The reflective areas are created by masking the the disc. The masking is then removed to reveal the desired pattern of alternating reflective and transparent areas. The desired optical illusion can be achieved from viewing the rotating disc from either side despite the fact that the disc prepared in his manner has the reflective material deposited on only one side.

Alternatively the alternating pattern of reflective and transparent field may be achieved by disposing openings in a reflective disc, the openings corresponding to the transparent areas of the above preferred embodiments of the disc, except for that depicted in FIG. 4E.

According to the practice of the invention as shown in FIG. 6, as the disc rotates, at a user selected speed, the user perceives alternating reflected and transmitted images. The image 31 transmitted is that of any object or person placed on the side of the disc opposite the user. The reflected image 32 is that of the user himself. As the disc rotates the alternating transmitted and reflected images are perceived by the viewer to merge. Therefore, for example, the user perceives the image of the girl 41 upon his own image 42 to form a fused image 43, the fused image having his glasses and mustache and her wavy hair. Similarly, the girl sees her image with his mustache and glasses.

Although limited embodiments of the viewing device have been described and illustrated herein, many modifications and variations will be apparent to one skilled in the art. Thus for example, while various patterns of alternating transparent and reflective areas of the circular disc have been disclosed, many other patterns are possible to achieve the desired result. Since many other modifications and variations can be provided it will be apparent that the invention can be practiced otherwise than as specifically described.

What is claimed is:

1. A viewing apparatus comprising:
a housing having a central opening;
reflective means mounted in the central opening of the housing, said reflective means having transparent areas and reflective areas disposed over the surface thereof according to a predetermined pattern;
means for rotatably supporting the reflective means at the periphery thereof in the central opening; and
drive means located in the housing linked to the supporting means for causing said reflective means to rotate at a selectable speed whereby an unobstructed view of both sides of the reflective means is provided.

2. The apparatus of claim 1 in which the housing comprises a base, an upright support projecting from the base and a ring-shaped structure positioned upon the top of the upright support defining the central opening.

3. The apparatus of claim 2 in which the ring-shaped structure provides alignment means for the reflective means.

4. The apparatus of claim 3 wherein the means for rotatably supporting the reflective means comprises a plurality of guides within the ring-shaped structure located at predetermined intervals around the periphery of the reflective means to provide means for maintaining the alignment of the reflective means with the ring-shaped structure.

5. The apparatus of claim 1 wherein the reflective means comprises a circular disc with a plurality alternating transparent and reflective areas disposed over the surface thereof.

6. The apparatus of claim 1 wherein the reflective means comprises a circular disc having alternating transparent and reflective circular sectors; the sectors having a central angle of approximately 90°.

7. The apparatus of claim 1 wherein the reflective means comprises a circular disc having alternating transparent and reflective circular sectors; the sectors having a central angle of approximately 60°.

8. The apparatus of claim 1 wherein the reflective means comprises a circular disc having alternating transparent and reflective circular sectors; the sectors having a central angle of approximately 180°.

9. The apparatus of claim 1 wherein the reflective means comprises a circular disc with a plurality of concentric circular fields, each field containing a plurality of alternating reflective and transparent areas, said areas being defined by a series of evenly spaced radii of said disc and the inner and outer circumferences of the respective circular fields.

10. The apparatus of claim 1 wherein the reflective means comprises a reflective circular disc having a plurality of circular transparent areas disposed over the surface of the disc.

11. The apparatus of claim 1 wherein the reflective means comprises a transparent circular disc having a plurality of reflective circular areas disposed over the surface of the disc.

12. The apparatus of claims 1, 5, 6, 7, 8, 9, 10 or 11 wherein the reflective means is a transparent disc having metalized reflective areas disposed over the surface thereof.

13. The apparatus of claims 1, 5, 6, 7, 8, 9 or 10 wherein the reflective means is a reflective disc having openings corresponding to the transparent areas, said openings being disposed over the surface of the disc according to the predetermined pattern.

14. The apparatus of claim 1 wherein the total surface area of the reflective areas and the total surface area of the transparent areas is approximately equal.

15. The apparatus of claim 1 wherein the drive means is comprised of an electric motor.

16. The apparatus of claim 15 wherein the electric motor means causes the reflective means to rotate about its central axis by frictionally coupling the motor drive shaft to the outer periphery of the reflective means.

17. The apparatus of claim 15 additionally comprising a speed controlling rheostat wherein the rheostat can be adjusted to control the speed of the motor by adjusting the flow of current from a current source.

18. The apparatus of claim 17 wherein the source of electrical current is supplied by dry cell batteries which are contained within the housing.

19. The apparatus of claim 17 wherein the source of electrical current is supplied externally via alternating line current.

20. The apparatus of claim 19 additionally comprising a transformer means and rectifier means to provide direct current of the proper voltage to the motor means.

* * * * *